(12) United States Patent
Randall et al.

(10) Patent No.: US 11,892,929 B2
(45) Date of Patent: Feb. 6, 2024

(54) MALFUNCTIONING SYSTEM IDENTIFICATION MECHANISM

(71) Applicant: NetApp, Inc., Sunnyvale, CA (US)

(72) Inventors: Charles Randall, Longmont, CO (US); Michael Keith Nunez, Lyons, CO (US)

(73) Assignee: NetApp, Inc., San Jose, CA (US)

( * ) Notice: Subject to any disclaimer, the term of this patent is extended or adjusted under 35 U.S.C. 154(b) by 85 days.

(21) Appl. No.: 17/078,804

(22) Filed: Oct. 23, 2020

(65) Prior Publication Data
US 2022/0129361 A1    Apr. 28, 2022

(51) Int. Cl.
*G06F 11/32*    (2006.01)
*G06F 11/30*    (2006.01)

(52) U.S. Cl.
CPC ........ *G06F 11/327* (2013.01); *G06F 11/3034* (2013.01); *G06F 11/325* (2013.01); *G06F 11/328* (2013.01)

(58) Field of Classification Search
None
See application file for complete search history.

(56) References Cited

U.S. PATENT DOCUMENTS

| | | | | |
|---|---|---|---|---|
| 7,302,593 B2* | 11/2007 | Rothman | ................. | G01S 5/14 713/340 |
| 8,291,266 B2* | 10/2012 | Windell | ................. | G06F 11/325 709/224 |
| 8,421,644 B2* | 4/2013 | Zhang | ................. | G06F 3/04847 340/815.45 |
| 8,589,741 B2* | 11/2013 | Windell | ................. | G06F 11/325 709/224 |
| 2004/0164166 A1* | 8/2004 | Mahany | ................. | G06F 11/324 235/472.02 |
| 2011/0066895 A1* | 3/2011 | Windell | ................. | G06F 11/325 714/E11.206 |
| 2011/0121247 A1* | 5/2011 | Houser | ................. | B66D 1/46 324/765.01 |
| 2011/0309947 A1* | 12/2011 | Zhang | ................. | G06F 11/326 340/691.8 |
| 2012/0216083 A1* | 8/2012 | Windell | ................. | H04L 41/0645 714/57 |
| 2017/0092082 A1* | 3/2017 | Tracht | ................. | G06F 11/326 |
| 2019/0036797 A1* | 1/2019 | Margalit | ................. | H04L 41/22 |
| 2020/0017024 A1* | 1/2020 | Mollo | ................. | B60Q 1/46 |
| 2020/0284402 A1* | 9/2020 | Gajiwala | ................. | H05K 1/189 |
| 2021/0329755 A1* | 10/2021 | Lauffer | ................. | G06F 11/325 |

* cited by examiner

*Primary Examiner* — Matthew J Brophy
(74) *Attorney, Agent, or Firm* — Jaffery Watson Mendonsa & Hamilton LLP (57) ABSTRACT

A management system is described. The management system includes an interface coupled to a plurality of infrastructure appliances and one or more processors to monitor each of the plurality of infrastructure appliances, detect a malfunction at a first of the infrastructure appliances, and transmit a display message to one or more of the plurality of infrastructure appliances that are adjacent to the first infrastructure appliance, wherein a display message indicates one or more activity light indicators to be activated at an adjacent infrastructure appliance.

19 Claims, 9 Drawing Sheets

MALFUNCTIONING SYSTEM IDENTIFICATION MECHANISM

BACKGROUND

Modern data centers include thousands of racks. Each of those racks comprise an open frame having multiple shelves, with each shelf supporting one or more infrastructure resource appliances (e.g., server, storage, switch, etc.). For example, a shelf may include a server and/or multiple storage drives. Additionally, each of the storage drives include multiple activity light indicators visible from the front of the rack. These activity light indicators typically comprise light emitting diodes (LEDs).

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

As discussed above, data centers include many racks. Specifically, a data center may have hundreds of aisles of racks, each having many shelves (or slots) of hardware devices. Currently, when a system administrator (or operator) receives an indication that a hardware appliance has failed, the system administrator may receive an indication on an application that specifically lists a physical address of the failed appliance. Upon receiving the information, the operator typically must search for the appliance using data center coordinates (e.g., aisle 27, rack 3 and slot 17). However, sometimes a problem may occur with operators misidentifying the appliance and instead performing a repair on an incorrect appliance. For instance, a system administrator may remove and repair an incorrect storage drive.

According to one embodiment, activity light indicators on an infrastructure appliance are implemented to display a signal that indicates a physical location of a failed (or failing) appliance. In such an embodiment, the activity light indicators may flash a sequence that distinguishes, and is recognizable by the operator as indicating, the failed (or failing) appliance. In a further embodiment, the activity light indicators may flash an encoded representation of the appliance serial number. In this embodiment, the operator may use a portable computing device to capture images and/or video of the encoded representation of the appliance serial number and decode the serial number to enable the operator to confirm that the appliance is the actual appliance that is to be repaired.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

Figure 1A:
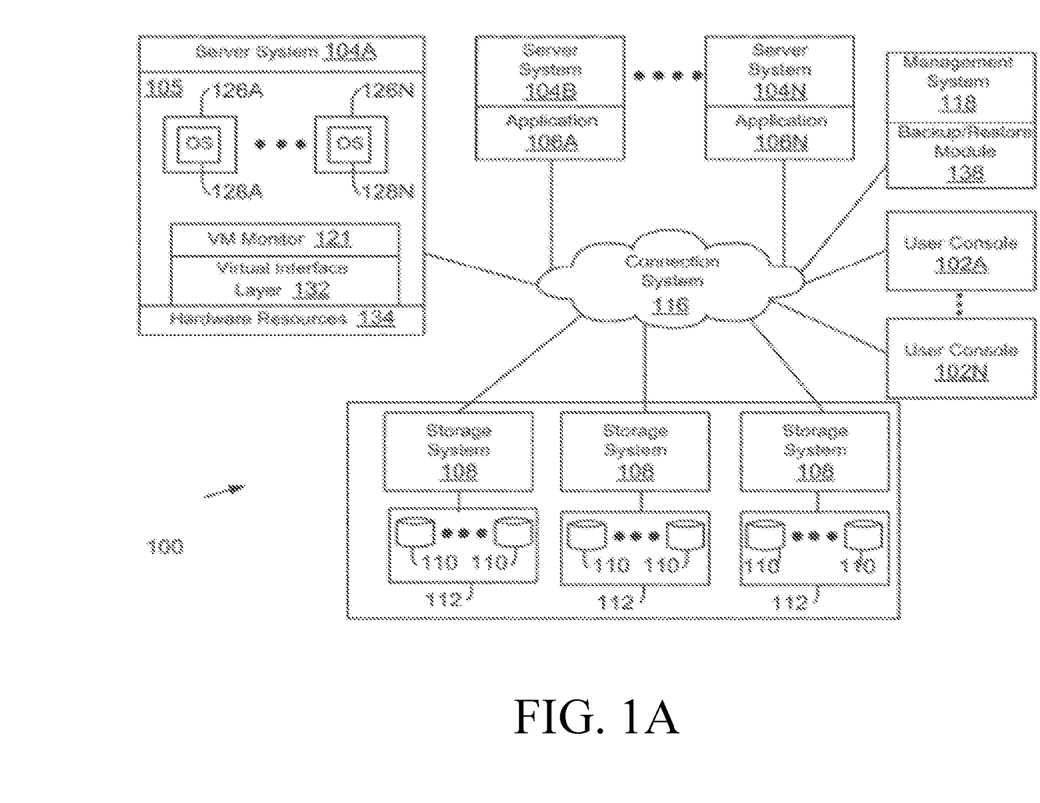
FIG. 1A illustrates one embodiment of a networked operating environment.

FIG. 1A illustrates one embodiment of a networked operating environment 100 (also referred to as system 100), for implementing the various adaptive aspects of the present disclosure. In one aspect, system 100 may include a plurality of computing systems 104A-104N (may also be referred to and shown as server system 104 or as host system 104) that may access one or more shared storage systems 108 via a connection system 116 such as a local area network (LAN), wide area network (WAN), the Internet and others. The server systems 104 may operate as computing nodes of a master-less database cluster and may communicate with each other via connection system 116, for example, for working collectively to provide data-access service to user consoles 102A-102N (may be referred to as user 102 or client systems 102).

Server systems 104 may be computing devices (or nodes) configured to execute applications 106A-106N (referred to as application 106 or applications 106) over a variety of operating systems, including the UNIX® and Microsoft Windows® operating systems. Applications 106 may utilize data services of storage system 108 to access, store, and manage data in a set of storage devices 110 that are described below in detail.

Application 106 may include a database program (for example, Cassandra and other similar database applications) that is executed in a distributed database cluster, as described below in detail. The term database node as used herein may include a stand-alone server or a virtual machine executing an instance of the database application.

Server systems 104 generally utilize file-based access protocols when accessing information (in the form of files and directories) over a network attached storage (NAS)-based network and/or object-based storage (or object storage). Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104A may also execute a virtual machine environment 105, according to one aspect. In the virtual machine environment 105 a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual execution environment 105 executes a plurality of VMs 126A-126N that execute a plurality of guest OS 128A-128N (may also be referred to as guest OS 128) to share hardware resources 134. As described above, hardware resources 134 may include CPU, memory, I/O devices, storage or any other hardware resource.

A virtual machine monitor (VMM) 121, for example, a processor executed hypervisor layer provided by VMWare Inc., Hyper-V layer provided by Microsoft Corporation (without derogation of any third party trademark rights) or any other layer type, presents and manages the plurality of guest OS 128A-128N. VMM 121 may include or interface with a virtualization layer (VIL) 132 that provides one or more virtualized hardware resource 134 to each guest OS. For example, VIL 132 presents physical storage at storage devices 110 as virtual storage (for example, as a virtual hard drive (VHD)) to VMs 126A-126N. The VMs use the VHDs to store information at storage devices 110.

In one aspect, VMM 121 is executed by server system 104A with VMs 126A-126N. In another aspect, VMM 121 may be executed by an independent stand-alone computing system, often referred to as a hypervisor server or VMM server and VMs 126A-126N are presented via another computing system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include a management system 118 for managing and configuring various elements of system 100. Management system 118 may include one or more computing systems for performing various tasks described below in detail. Management system 118 may also execute or include a backup/restore module 138 (for brevity referred to as backup module 138) that executes the various process blocks of the innovative backup technology.

In one aspect, storage system 108 is a shared storage system having access to a set of mass storage devices 110 (may be referred to as storage devices 110) within a storage subsystem 112. As an example, storage devices 110 may be a part of a storage array within the storage sub-system 112. Storage devices 110 are used by the storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 121 as a storage volume or one or more qtree sub-volume units including LUNs. Each storage volume (or LUN) may be configured to store data files (or data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the terms "disk" and "drive" as used herein is intended to mean any storage device/space and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP, or object storage protocols.

As an example, in a typical mode of operation, server system 104 (or VMs 126A-126N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104. In one aspect, storage system 108 may also have a distributed architecture, for example, a cluster based architecture that may include a separate network module and storage module.

Figure 1B:
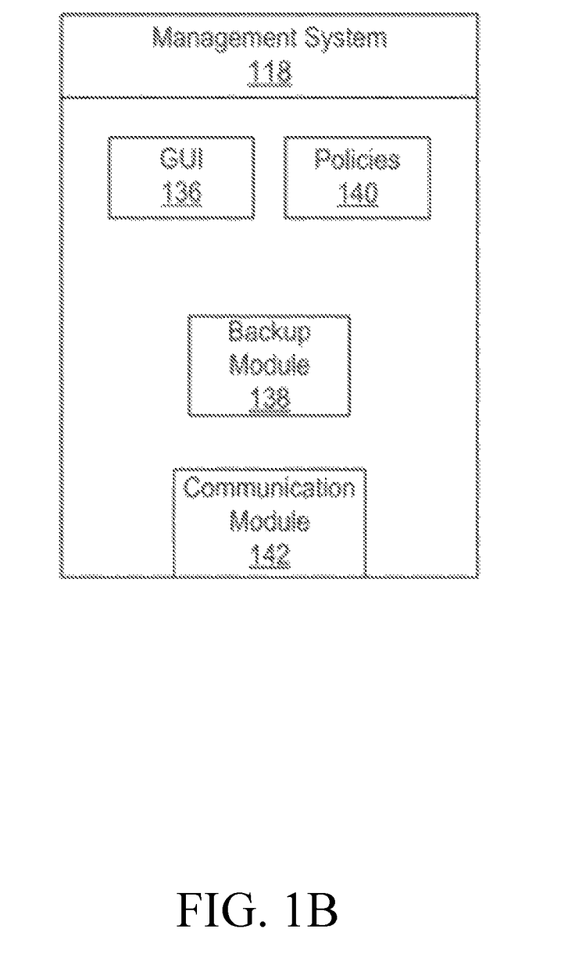
FIG. 1B illustrates one embodiment of a management system.

FIG. 1B shows a block diagram of management system 118 with the backup module 138, according to one aspect of the present disclosure. The various modules of management system 118 may be implemented in one computing system or in a distributed environment among multiple computing systems. For example, the backup module 138 may be executed by a standalone server and/or VM.

In the illustrated aspect, the management system 118 may include a graphical user interface (GUI) module 136 to generate a GUI for use by a user. In another aspect, management system 118 may present a command line interface (CLI) to a user. The GUI may be used to receive requests to setup backup policies 140 based on which, the backup module 138 executes backup and/or restore operations.

Management system 118 may also include a communication module 142 that implements one or more conventional network communication protocols and/or APIs to enable the various modules of management system 118 to communicate with the various computing nodes of a database cluster 130, storage system 108, VMs 126A-126N, server system 104 and clients 102. Management system 118 also includes other modules discussed in more detail below.

Figure 2A:
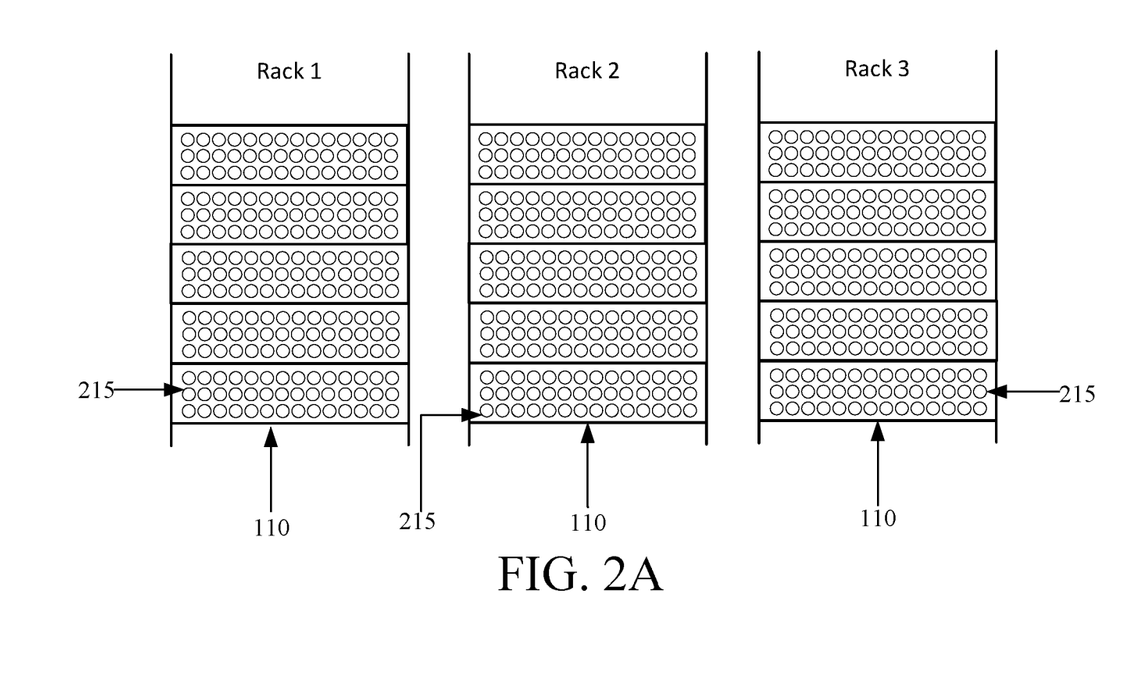
FIGS. 2A-2C illustrate embodiments of a rack configuration.

According to one embodiment, storage devices 110 in storage subsystem system 108 are organized in a rack configuration within a data center. FIG. 2A illustrates one embodiment of a rack configuration, in which racks (e.g., Racks 1-3) each include a plurality of storage devices 110. As shown in FIG. 2A, each storage device 110 comprises a plurality of activity light indicators 215. According to one embodiment, activity light indicators 215 comprise semiconductor light sources (e.g., LEDs) that are implemented to provide a visual status of a storage device 110. In such an embodiment, each activity light indicator 215 may provide one or more status indicators for the storage device 110. For example, one or more activity light indicators 215 may provide a health status (e.g., normal operation, degraded condition, or critical condition) of the storage device 110, while other activity light indicators 215 may provide the status of the internal drives. Activity light indicators 215 may also be used to provide other status types (e.g., power status on/off, thermal warnings, etc.).

Figure 3A:
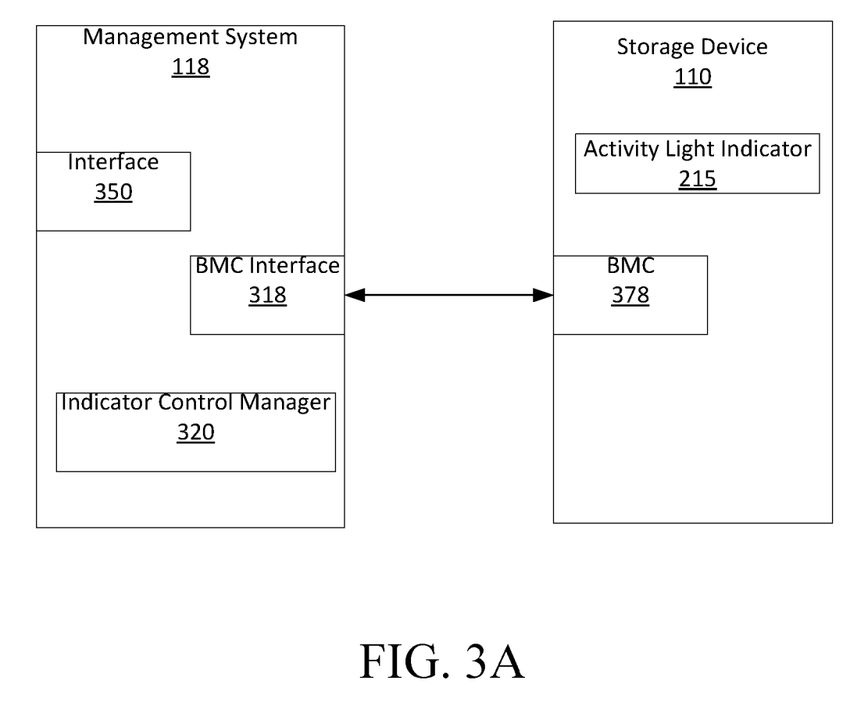
FIGS. 3A&3B illustrate other embodiments of a management system.

FIG. 3A illustrates one embodiment of management system 118 coupled to storage device 110. As shown in FIG. 3A, in one embodiment, management system 118 includes an indicator control manager 320 to control activity light indicators 215 within each storage device 110. In this embodiment, the indicator control manager 320 communicates with each storage device 110 within a storage subsystem system 108 in order to receive status information from the storage device 110. Upon receiving a message from a storage device 110 indicating that the device is experiencing a malfunction that involves maintenance to be performed by an operator, the indicator control manager 320 transmits a message to the storage device 110 that is to be displayed using the activity light indicators 215. The displayed message encoded within the activity light indicators may include static or dynamic lighting configurations. For example, a static pattern (e.g., lines, shapes, alphanumeric strings, and/or the like) may be displayed with the activity light indicators allowing for identification of the malfunctioning equipment. As another example, a dynamic pattern that changes over time (e.g., lines, shapes, alphanumeric strings, blinking lights, and/or the like) may be used for identification of the malfunctioning equipment.

Management system 118 also includes a baseboard management controller (BMC) interface 318 and indicator control manager 320. BMC interface 318 is implemented to communicate with a BMC 378 at storage device 110 to perform management and provisioning operations (e.g., power-up, reset, update firmware, set BIOS, set Boot disk, get serial number, etc.). In embodiments, BMC interface 318 facilitates communication between indicator control manager 320 and BMC 378 via an input/output controller (IOCTL) interface driver, a Representational state transfer (REST) application program interface (API), or some other system software proxy.

As used herein, a BMC is a specialized service processor that monitors the physical state of a storage device 110 (or other hardware) using sensors and communicates with management system 118 via an independent "out-of-band" connection. In one embodiment, BMC 378 has access to hardware components within a storage device 110, and is configured to directly modify the hardware components. As a result, BMC 378 enables indicator control manager 320 to control the activity light indicators 215 at each storage device 110. Although described herein with reference to BMC, other embodiments may feature different types of controllers that communicate with management system 118 via a side-band (or out-of-band) interface.

In one embodiment, indicator control manager 320 monitors the BMC 378 at each storage device 110 in a storage sub-system 112 via BMC interface 318 to determine the status of the storage device 110. In this embodiment, indicator control manager 320 may detect malfunctioning storage device 110 upon receiving a message from a storage device 110 indicating a malfunction. Upon detecting a malfunctioning storage device 110 (e.g., via a message received via a BMC 378) indicator control manager 320 transmits a display message to the BMC 378 that is to be displayed by activity light indicators 215. In one embodiment, the display message includes an encoded message that is to be displayed at activity light indicators 215. In such an embodiment, the display message comprises identifier information associated with the storage device 110 (e.g., serial number). However, in other embodiments, the display message may include an encoded representation of identifier information. In addition to the display message, indicator control manager 320 may transmit additional information to BMC 378. For example, information such as infoType, Fault Code(s), Node or Appliance Serial Number, NodeId, Status, Error Message may be transmitted.

Figure 2B:
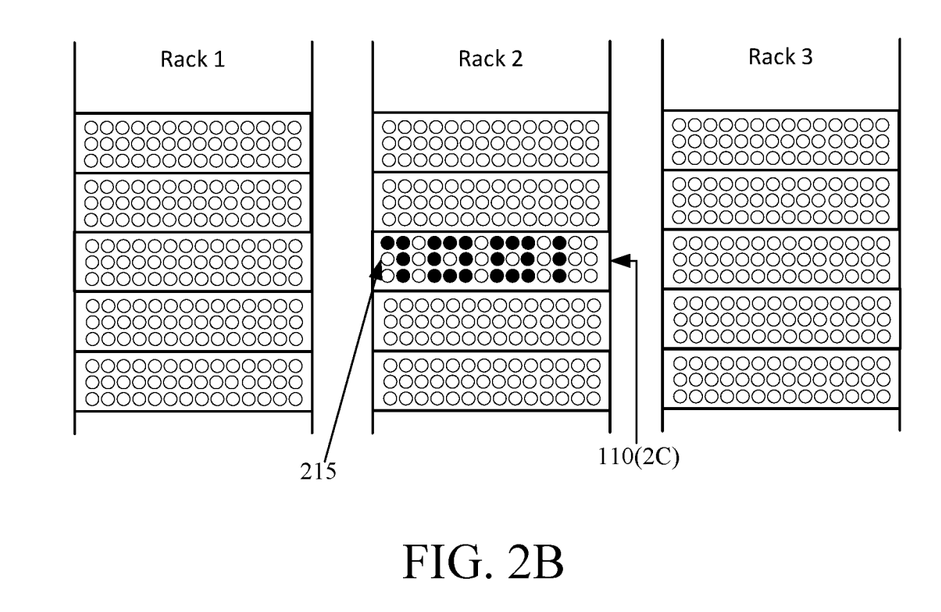

In response to receiving the display message, the BMC 378 causes one or more of the activity light indicators 215 at a storage device 110 to flash in order to reveal the physical location of the storage device 110, or other information types supported by this capability. In this embodiment, the activity light indicators 215 may flash a sequence that distinguishes the storage device 110 from other devices in the same rack or neighboring racks. In a further embodiment, activity light indicators 215 flash the encoded representation of the appliance serial number. For example, FIG. 2B illustrates another embodiment of the rack configuration, in which the activity light indicators 215 in storage device 110(2C) in Rack 2 display the identifier information (or an representation of the identifier information) that is to be recognized by an operator deployed to perform maintenance on storage device 110(2C).

In some embodiments, storage device 110 may be unable to receive communications from control manager 320. As such, control manager 320 may identify one or more storage devices in a proximate (or adjacent) location to the malfunctioning storage device 110, and transmit a message to the one or more adjacent storage devices. Accordingly, the adjacent storage device indicators can guide the operator to the malfunctioning equipment that needs to be replaced. For example, in some embodiments, the adjacent storage devices can all be instructed to display an arrow using the activity light indicators pointing to the failed (or failing) storage device.

Figure 3B:
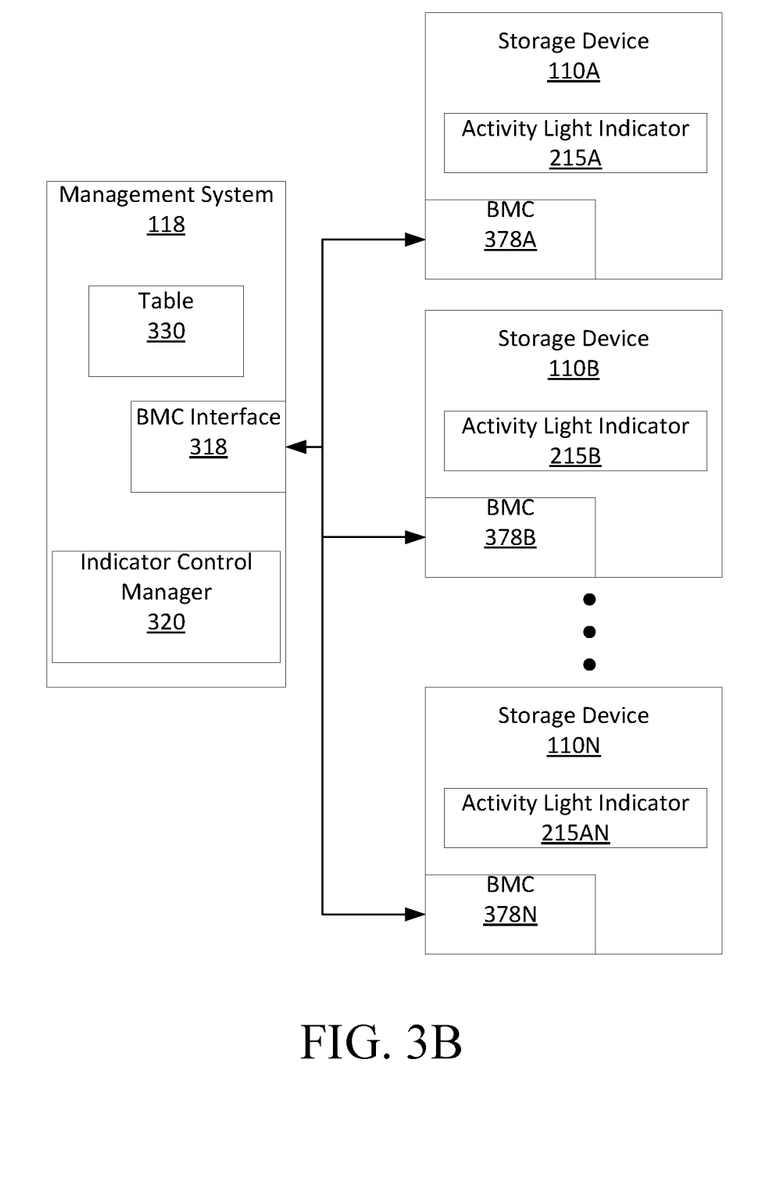

FIG. 3B illustrates such an embodiment of management system 118 in which indicator control manager 320 communicates with storage devices 110 adjacent to a malfunctioning storage device 110. As shown in FIG. 3B, interface 318 is implemented to communicate with BMCs (e.g., 378A-378N) within each storage device (e.g., 110A-110N). In such an embodiment, storage device 110B may be malfunctioning and unable to receive communications from indicator control manager 320. In such instances, indicator control manager 320 may transmit a display message to one or more of the storage devices 110 (e.g., storage devices 110A, 110C . . . 110N) adjacent to storage device 110B. In this embodiment, indicator control manager 320 maintains a table 330 that includes the position of each storage device 110 relative to all adjacent storage devices 110 in the same rack and neighboring racks.

Figure 2C:
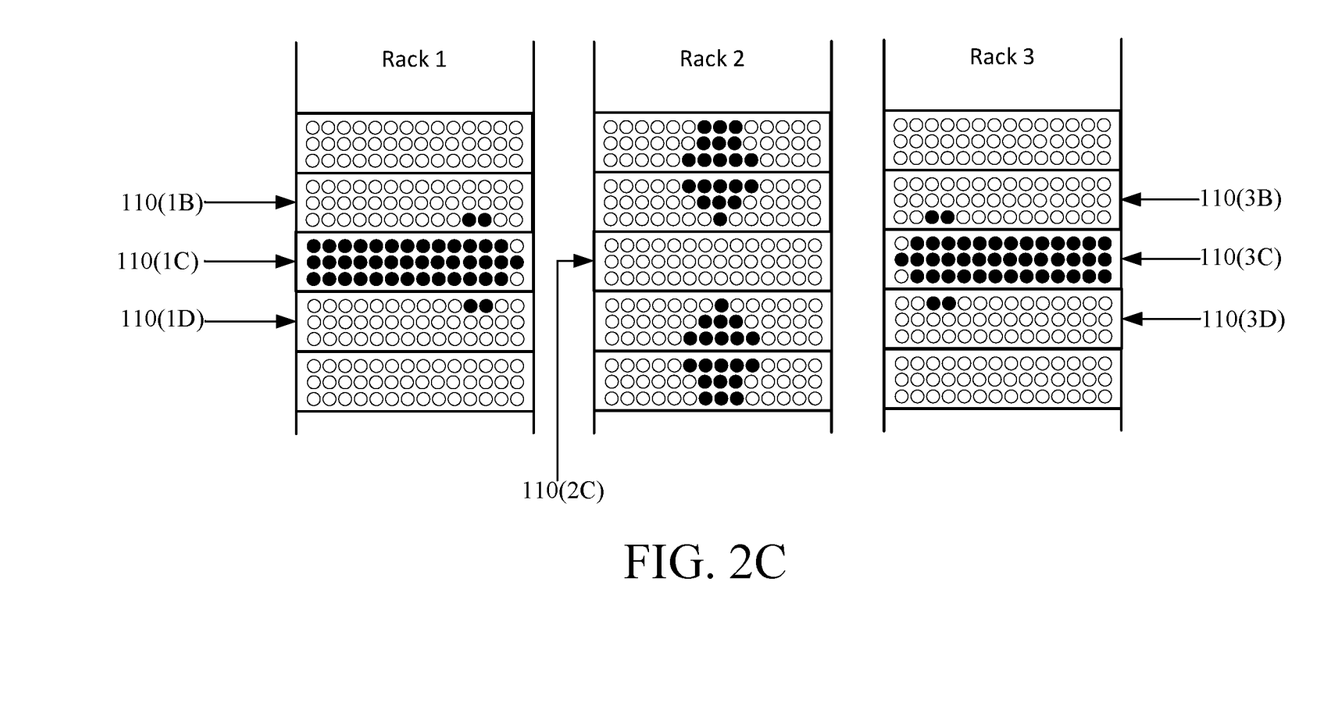

FIG. 2C illustrates another embodiment of the rack configuration, in which the activity light indicators 215 in storage devices 110 that are adjacent to storage device 110(2C) in Rack 2 display identifier information. In one embodiment, the identifier information comprises information to identify the malfunctioning storage device 110. As shown in FIG. 2C, the identifier information transmitted to the adjacent storage devices 110 forms arrows via the activity light indicators 215 of the adjacent storage devices (e.g., 110(1B)-110(1D) in Rack 1, 110(3B)-110(3D) in Rack 3, etc.) that point to the malfunctioning storage device 110(2C). In this embodiment, indicator control manager 320 accesses table 330 to determine the storage devices 110 adjacent to storage device 110(2C) and transmits a different display message to each adjacent storage device 110 in order to provide an indication as to which activity light indicators 215 are to be activated (or lit).

In other embodiments, the displayed identifier information may include static or dynamic lighting configurations. For example, a static pattern (e.g., lines, shapes, alphanumeric strings, and/or the like) may be displayed with the activity light indicators allowing for identification of the malfunctioning equipment. As another example, a dynamic pattern that changes over time (e.g., lines, shapes, alphanumeric strings, blinking lights, and/or the like) may be used for identification of the malfunctioning equipment.

Figure 4:
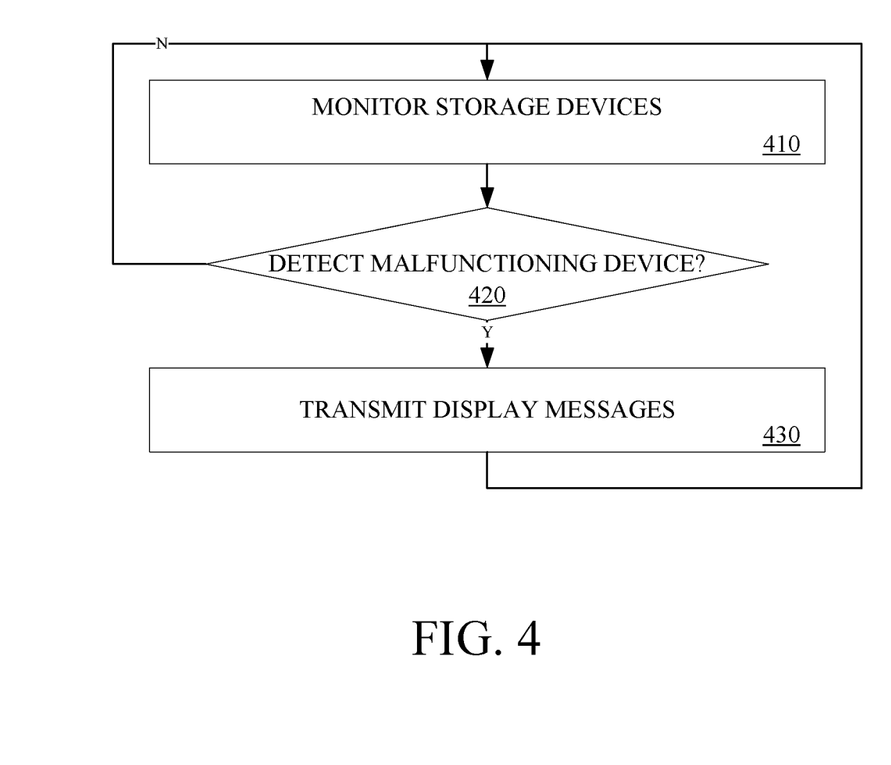
FIG. 4 is a flow diagram illustrating one embodiment of a process performed by a management system.

FIG. 4 is a flow diagram illustrating one embodiment of a process performed by a management system. At processing block 410, the management system monitors storage devices in a storage sub-system. As discussed above, the management system monitors storage devices via a BMC located at each device. At processing block 420, a determination is made as to whether a malfunctioning device has been detected. As mentioned above, a malfunctioning storage device is detected at the management system by receiving a message indicating the malfunction from the storage device 110. Upon detecting a malfunctioning device, display messages are transmitted to devices adjacent to the malfunctioning device, processing block 430. As discussed above, a display message may also be transmitted to the malfunctioning device. Subsequently, control is returned to processing block 410, where the management system continues to monitor the storage devices.

Figure 5:
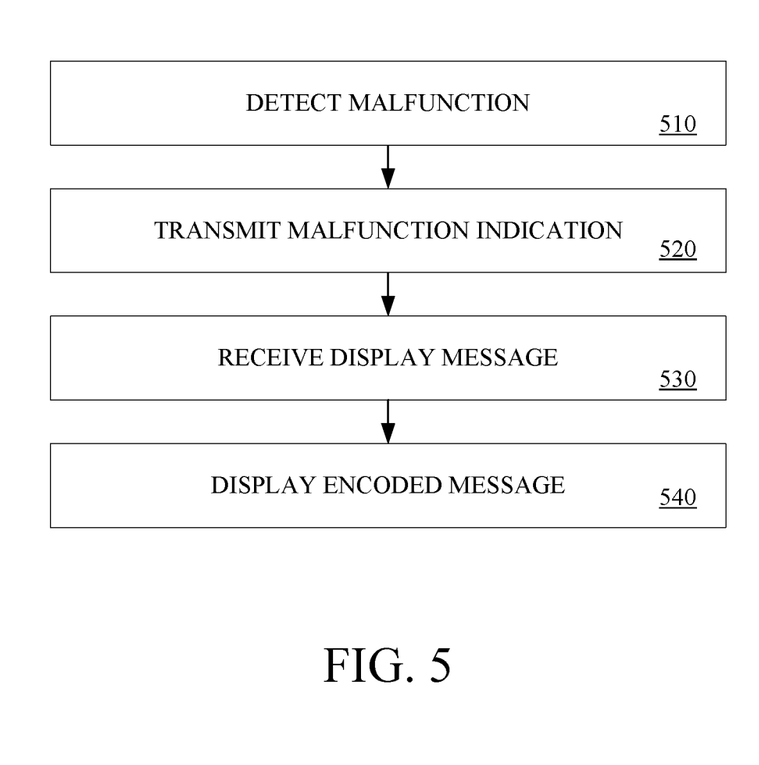
FIG. 5 is a flow diagram illustrating one embodiment of a process performed by a storage device.

FIG. 5 is a flow diagram illustrating one embodiment of a process performed by a storage device. At processing block 510, the BMC within the storage device detects that there is a malfunction with the device. In accordance with various embodiments, the device may regularly communicate health status which can be used to identify a malfunction. In other embodiments, the BMC may periodically ping the devices. At processing block 520, the BMC transmits a message to the management system indicating the malfunction. At processing block 530, the BMC receives the display message. At processing block 540, the BMC displays the encoded message at the activity light indicators. As discussed above, the encoded message may be used by an operator to identify the malfunctioning device to enable the operator to perform maintenance on the proper device.

As mentioned above, adjacent storage devices also receive the display messages in instances in which the malfunctioning device is unable to receive communications from indicator control manager 320. As a result, the adjacent to storage devices display arrows formed via the activity light indicators of the adjacent storage devices that point to the malfunctioning device. Although discussed above with reference storage devices, other embodiments may implement activity light indicators at different types of infrastructure appliances in a rack (e.g., server, switches, power devices, etc.).

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A management system, comprising:
  an interface coupled to a plurality of infrastructure appliances; and
  one or more processors to monitor each of the plurality of infrastructure appliances in a plurality of data center racks, detect a malfunction at a first infrastructure appliance in a first data center rack having a first plurality of activity light indicators, access a table to determine infrastructure appliances adjacent to the first infrastructure appliance, transmit a first display message to a second infrastructure appliance having a second plurality of activity light indicators in a second data center rack indicated in the table as being adjacent to the first infrastructure appliance and transmit a second display message to a third infrastructure appliance in the second data center rack having a third plurality of activity light indicators, wherein the first display message indicates a first shape to be displayed by the second plurality of activity light indicators to identify the first infrastructure appliance and the second display message indicates a second shape to be displayed by the third plurality of activity light indicators to identify the first infrastructure appliance.

2. The management system of claim 1, wherein the first shape displayed by the second plurality of activity light indicators is different than the second shape displayed by the third plurality of activity light indicators.

3. The management system of claim 1, wherein the one or more processors further transmit a third display message to a fourth infrastructure appliance having a fourth plurality of activity light indicators in the first data center rack indicated in the table as being adjacent to the first infrastructure appliance.

4. The management system of claim 3, wherein the one or more processors further transmit a fourth display message to a fifth infrastructure appliance having a fifth plurality of activity light indicators in a third data center rack indicated in the table as being adjacent to the first infrastructure appliance.

5. The management system of claim 1, wherein detecting the malfunction at the first infrastructure appliance comprises receiving a message from the first infrastructure appliance indicating the malfunction.

6. The management system of claim 1, wherein the plurality of infrastructure appliances comprise storage devices.

7. A non-transitory machine-readable medium storing instructions which, when executed by a processor, cause the processor to:
  monitor each of a plurality of infrastructure appliances in a plurality of data center racks;
  detect a malfunction at a first infrastructure appliance in a first data center rack having a first plurality of activity light indicators;
  access a table to determine infrastructure appliances adjacent to the first infrastructure appliance;
  transmit a first display message to a second infrastructure appliance having a second plurality of activity light indicators in a second data center rack indicated in the table as being adjacent to the first infrastructure appliance; and
  transmit a second display message to a third infrastructure appliance in the second data center rack having a third plurality of activity light indicators, wherein the first display message indicates a first shape to be displayed by the second plurality of activity light indicators to identify the first infrastructure appliance and the second display message indicates a second shape to be displayed by the third plurality of activity light indicators to identify the first infrastructure appliance.

8. The non-transitory machine-readable medium of claim 7, wherein the first shape displayed by the second plurality of activity light indicators is different than the second shape displayed by the third plurality of activity light indicators.

9. The non-transitory machine-readable medium of claim 8, storing instructions which, when executed by a processor, further cause the processor to transmit a third display message to a fourth infrastructure appliance having a fourth plurality of activity light indicators in the first data center rack indicated in the table as being adjacent to the first infrastructure appliance.

10. The non-transitory machine-readable medium of claim 9, storing instructions which, when executed by a processor, further cause the processor to transmit a fourth display message to a fifth infrastructure appliance having a fifth plurality of activity light indicators in a third data center rack indicated in the table as being adjacent to the first infrastructure appliance.

11. The non-transitory machine-readable medium of claim 10, wherein detecting the malfunction at the first infrastructure appliance comprises receiving a message from the first infrastructure appliance indicating the malfunction.

12. A method comprising:
  monitoring each of a plurality of infrastructure appliances in a plurality of data center racks;
  detecting a malfunction at a first infrastructure appliance in a first data center rack having a first plurality of activity light indicators;
  accessing a table to determine infrastructure appliances adjacent to the first infrastructure appliance;
  transmitting a first display message to a second infrastructure appliance having a second plurality of activity light indicators in a second data center rack indicated in the table as being adjacent to the first infrastructure appliance; and
  transmitting a second display message to a third infrastructure appliance in the second data center rack having a third plurality of activity light indicators, wherein the first display message indicates a first shape to be displayed by the second plurality of activity light indicators to identify the first infrastructure appliance and the second display message indicates a second shape to be displayed by the third plurality of activity light indicators to identify the first infrastructure appliance.

13. The method of claim 12, wherein the first shape displayed by the second plurality of activity light indicators is different than the second shape displayed by the third plurality of activity light indicators.

14. The method of claim 13, further comprising transmitting a third display message to a fourth infrastructure appliance having a fourth plurality of activity light indicators in the first data center rack indicated in the table as being adjacent to the first infrastructure appliance.

15. The method of claim 14, further comprising: transmitting a fourth display message to a fifth infrastructure appliance having a fifth plurality of activity light indicators in a third data center rack indicated in the table as being adjacent to the first infrastructure appliance.

16. The method of claim 15, wherein detecting the malfunction at the first infrastructure appliance comprises receiving a message from the first infrastructure appliance indicating the malfunction.

17. The management system of claim 1, wherein the first display message is different than the second display message.

18. The non-transitory machine-readable medium of claim 7, wherein the first display message is different than the second display message.

19. The method of claim 14, wherein the first display message is different than the second display message.

* * * * *